US006766443B2

United States Patent
Sinharoy

(10) Patent No.: US 6,766,443 B2
(45) Date of Patent: Jul. 20, 2004

(54) COMPRESSION OF EXECUTION PATH HISTORY TO IMPROVE BRANCH PREDICTION ACCURACY

(75) Inventor: Balaram Sinharoy, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 607 days.

(21) Appl. No.: 09/859,247

(22) Filed: May 17, 2001

(65) Prior Publication Data

US 2002/0194465 A1 Dec. 19, 2002

(51) Int. Cl.[7] .................................................. G06F 9/40
(52) U.S. Cl. ....................................................... 712/239
(58) Field of Search ............................... 712/238, 239, 712/240

(56) References Cited

U.S. PATENT DOCUMENTS 5,805,878 A * 9/1998 Rahman et al. ............. 712/239
5,918,046 A * 6/1999 Hoyt et al. .................. 712/239
6,484,285 B1 * 11/2002 Dent ........................... 714/791
6,598,152 B1 * 7/2003 Sinharoy ..................... 712/228

* cited by examiner

Primary Examiner—Eric Coleman
(74) Attorney, Agent, or Firm—Richard F. Frankeny; Winstead Sechrest & Minick P.C.; Mark E. McBurney

(57) ABSTRACT

In a system where a path history vector is used in conjunction with a branch history table, an algorithm is disclosed for reducing the number of bits required for a path history vector. The path history vector is used to address a branch history table. Since the path history vector may contain a large number of zeros, this may lead to branch predictions that are inaccurate because of the limited size of the path history vector and the corresponding branch history table. A compression algorithm is disclosed where zeros in the path history vector are compressed. The number of zeros greater than one but less than a maximum are compressed in a single zero. With a compressed path history vector, inner loops with larger iterations or loops with larger instructions or branches are predicable with greater accuracy.

22 Claims, 7 Drawing Sheets

COMPRESSION OF EXECUTION PATH HISTORY TO IMPROVE BRANCH PREDICTION ACCURACY

TECHNICAL FIELD

The present invention relates in general to branch prediction in speculative execution of instructions in a software program.

BACKGROUND INFORMATION

In many computer architectures instructions are executed speculatively to improve the processing speed. Instructions are fetched several cycles before they are executed. When a conditional branch instruction is encountered, to keep the pipeline full a prediction is made about the direction of the branch, that is, whether the branch will be resolved taken or not-taken. Based on the prediction, instructions are fetched and executed from the predicted path after the branch instruction. If the prediction is correct, nothing needs to be done to change the instruction fetching. However, if the prediction is incorrect, instructions fetched after the branch instruction need to be discarded from the machine and new instructions need to be fetched, either from the target path of the branch (if the branch is resolved as taken) or from the sequential path of the branch (if the branch is resolved as not-taken).

Branch prediction algorithms have been implemented to aid in determining which path of a branch will be taken during a series of passes through a branch instruction.

A branch prediction algorithm may combine two prediction schemes known as, global prediction and local prediction. In the global prediction algorithm, the address of the branch instruction being predicted is correlated (by XORing) with the address of the "path of execution" to reach the branch instruction in order to determine the entry in the global branch history table that should be used for predicting the direction of the conditional branch. The "path of execution" is defined (in this example) by a N-bit string of logic zeroes and logic ones representing the last N actual fetch groups (on a mis-prediction or any other redirection of the instruction fetching the path is corrected). A sequential fetch group is represented by a zero and a non-sequential fetch group is represented by a logic one. This string of N-bits is sometimes referred as a path history vector.

The length of the path history vector (N) is related to the number of entries (M), in a Branch History Table (BHT), by the equation $N<=\lg(M)$, where "lg" stands for a logarithm to the base two. Since the number of BHT entries is limited, the length of path history is also limited. The limited length of the path history vector may cause many branches to be unpredictable. The amount of history needed for predicting a particular branch often depends on the program. Studies have shown that scientific workload often requires longer history for accurate branch prediction. This is especially true for nested loops where the inner loop is unrolled to some extent.

In a program instruction flow, where there are a large number of fetch groups in a loop, the path history vector may not be long enough to capture the history and make highly accurate predictions. There is, therefore, a need for a method to compress the path history vector and improve the prediction in speculative instruction execution.

SUMMARY OF THE INVENTION

A path history vector is a shift register of length N that maintains a sequence of binary bits that represent the actual instruction fetch behavior for the last N actual instruction fetches. The path history vector identifies a speculative path of execution with all the correction to the speculation known to the processor at that time. The path of execution is identified by this N-bit vector, one bit per fetch group (a fetch group is a group of instructions fetched in a cycle), for each of the previous N fetch groups. Each bit in the path history vector indicates whether the next group of instructions fetched are from a sequential cache sector (0) or not (1). A path history vector captures this information for the actual path of execution through these sectors. That is, if there is a redirection of instruction fetching (for any reason, such as an interrupt, branch mis-prediction, delayed cache miss detection, table-look-aside buffer (TLB) miss detection, etc.), some of the groups of fetched instructions are discarded and the path history vector is corrected immediately. The path history vector is hashed (by bitwise exclusive ORing (XOR)) with the address of the branch instruction to address an entry into the global history table (which contains a total of $2^N$ entries) to produce a branch direction prediction. The accuracy of prediction depends on how much path history is necessary to determine a most likely action on conditional branches. If certain programs have branch behavior that requires a large path history vector, then the corresponding branch history table may be larger than necessary because all possible table entries may not be used and thus are not of interest. A novel algorithm compresses zeroes in the path history vector to enable such branches to be predicted in a smaller branch history table.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
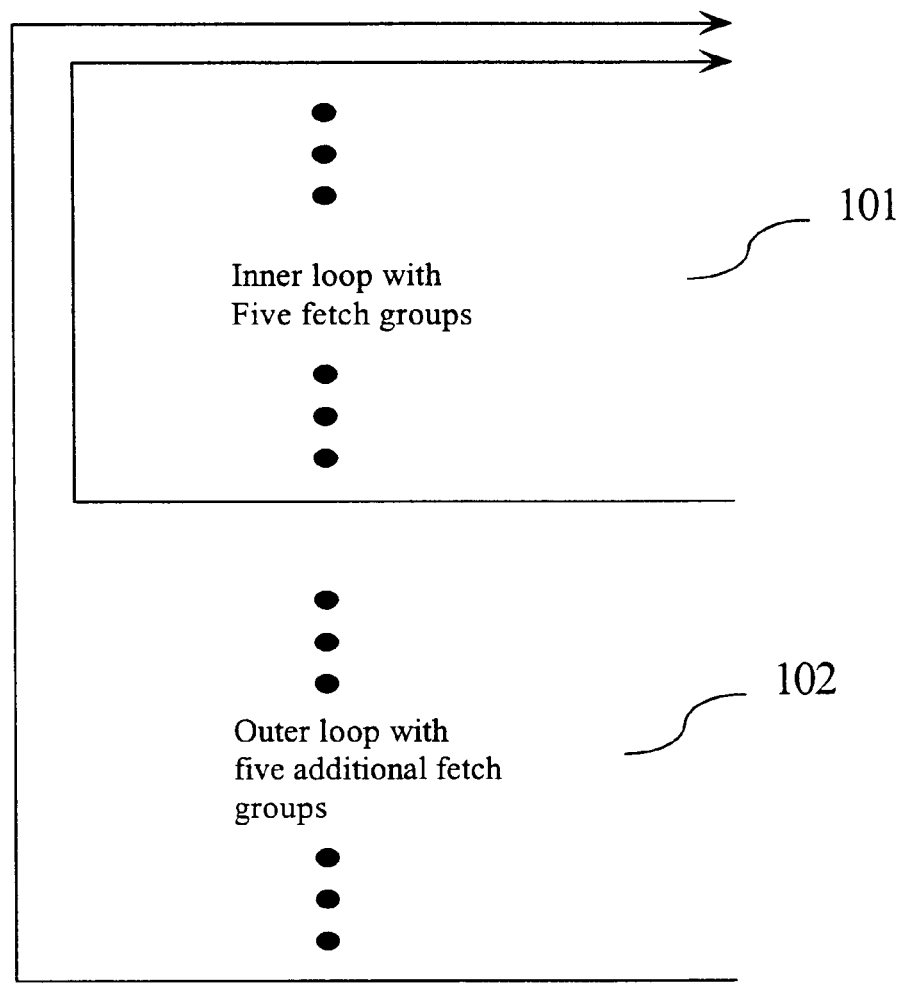
FIG. 1 illustrates nested loops that contain branch instructions.

In the following description, numerous specific details are set forth such as specific word or byte lengths, etc. to provide a thorough understanding of the present invention. However, it will be obvious to those skilled in the art that the present invention may be practiced without such specific details. In other instances, well-known elements have been shown in block diagram form in order not to obscure the present invention in unnecessary detail. For the most part, details and the like may have been omitted in as much as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numerals through the several views.

Figure 4:
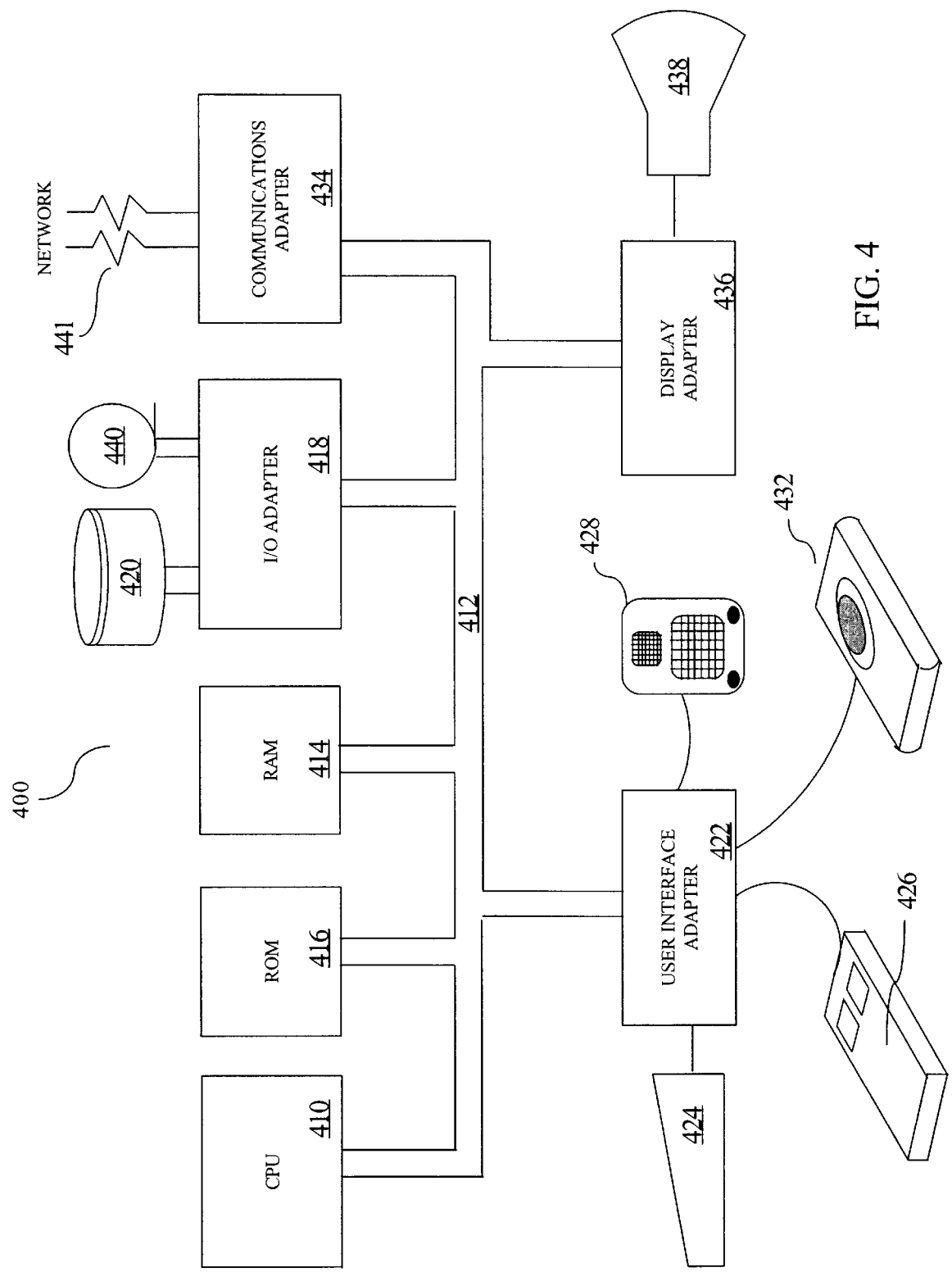
FIG. 4 is a high level functional block diagram of a representative data processing system suitable for practicing the principles of the present invention.

FIG. 4 is a high level functional block diagram of a representative data processing system 400 suitable for practicing the principles of the present invention. Processing system 400, includes a central processing system (CPU) 434 operating in conjunction with a system bus 412. CPU 410 may be, for example, a reduced instruction set computer (RISC), such as an IBM POWERPC™ Processor, or a complex instruction set computer (CISC). System bus 412 operates in accordance with a standard bus protocol, such that as the ISA protocol, compatible with CPU 410. CPU 410 operates in conjunction with read-only memory (ROM) 16 and random access memory (RAM) 414. Among other things, ROM 416 supports the Basic Input Output System (BIOS). For example RAM 414 includes, DRAM (Dynamic Random Access Memory) system memory and SRAM (Static Random Access Memory) external cache. I/O Adapter 418 allows for an interconnection between the devices on system bus 412 and external peripherals, such as mass storage devices (e.g., a hard drive, floppy drive or CD/ROM drive), or a printer. A peripheral device 420 is, for example, coupled to a peripheral control interface (PCI) bus, and I/O adapter 418 therefore may be a PCI bus bridge. User interface adapter 422 couples various user input devices, such as a keyboard 424, mouse 26, touch pad 432 or speaker 428 to the processing devices on bus 412. Display adapter 436 supports a display 438 which maybe, for example, a cathode ray tube (CRT), liquid crystal display (LCD) or similar conventional display unit. Display adapter 436 may include among other things a conventional display controller and frame buffer memory. Data processing system 400 may be selectively coupled to a computer or telecommunications (telcom) network through communications adapter 434. Communications adapter 434 may include for example, a modem for connection to a telcom network and/or hardware and software for connecting to a computer network such as a local area network (LAN) or wide are network (WAN).

Figure 6:
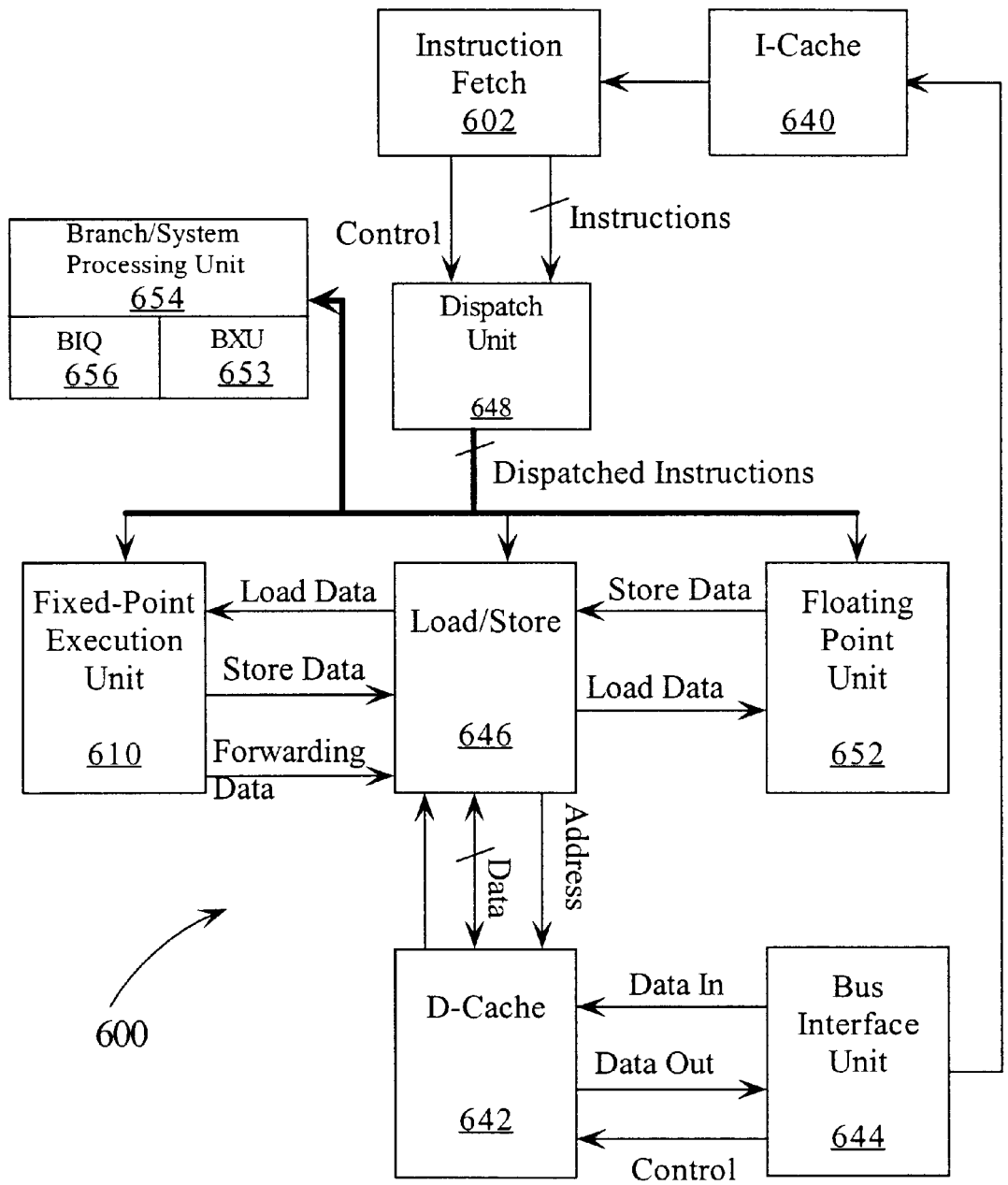
FIG. 6 is a high level functional block diagram of selected operational blocks within a central processing unit (CPU) incorporating embodiments of the present invention for branch instruction prediction.

FIG. 6 is a high level functional block diagram of selected operational blocks within a CPU (e.g., CPU 410). In the illustrated embodiment, CPU 410 includes internal Instruction Fetch Unit 602, Instruction Cache (I-Cache) 640, and Data Cache (D-cache) 642 which are accessible through bus 412 and Bus Interface Unit 644 and Load/Store unit 646. In the depicted architecture, CPU 410 operates on data in response to instructions retrieved from I-Cache 640 through instruction dispatch unit 648. In response to dispatch instructions, data retrieved from D-Cache 642 by load/store unit 646 may be operated upon using either Fixed Point Execution Unit 610 or Floating Point Execution Unit 652. Instruction branching is controlled by Branch/System Processing Unit 654. Branch/System Processing Unit 654 includes a Branch Information Queue (BIQ) 656. BIQ 656 contains all the information concerning branch instructions that were executed speculatively. This information is accessed during execution in the actual path to update the history vector and history table.

One embodiment of the present invention provides a new algorithm to improve the branch prediction accuracy by capturing more path information in the N-bit path history vector. The following example illustrates the branch prediction mechanism in accordance with the present invention. In the program below, the italicized "bc" instruction changes direction in every successive iteration. However, with a path history-based prediction mechanism the branch is perfectly predictable. After initially having five mis-predicts for this particular branch, the path history will be a repetition of the pattern "011" and the prediction mechanism learns the following:

1. If the history vector is 11011011011 then predict "Not taken"
2. If the history vector is 01101101101 then predict "Taken"

Consider a sequence of instructions, which may be written in PowerPC™ (PowerPC™ is a trademark of International Business Machines Corp.) assembly language as:

| (1)  | LB00 | addic | G0, G2, 0 | |
|------|------|-------|-----------|---|
| (2)  | LB01 | cmp   | 00, 0, G0, G1 | |
| (3)  |      | bc    | 0C, 02, <LB00> | /. Direction toggles; executes 63 times; . / |
| (4)  |      | nop   |           | /. Mis-predicts first 5 times only. / |
| (5)  |      | nop   |           | |
| (6)  |      | nop   |           | |
| (7)  |      | nop   |           | |
| (8)  |      | nop   |           | |
| (9)  |      | addic | G0, G1, 0 | |
| (10) |      | add   | G4, G4, G1 | |
| (11) |      | cmp   | 00, 0, G4, G5 | |
| (12) |      | bc    | 04, 02, <LB01> | /. Loops 32 times; mis-predicts twice. / |

Assume that the code snippet starts at the beginning of a cache sector, where each cache sector is 32 bytes long and can contain eight 4-byte instructions. If the branch in instruction (3) is taken, then the fetch group contains only instructions (1) through (3), and the instruction fetching after the branch starts from instruction (1) again. However, if the branch in instruction (3) is not-taken then the first fetch group contains instructions (1) through (8) and the following fetch group which ends with the branch in instruction (12) contains instructions (9) through (12). Although the code snippet above is written in PowerPC™ assembly, it would be understood by an artisan of ordinary skill in the art that the invention is not limited to the PowerPC™ processor and, in particular, a similar sequence of operations may be written in an assembly language corresponding to other microprocessor systems. In the above, G0, G1, G2, G4, and G5 correspond to five general purpose registers. These are initialized with the exemplary values 0, 1, 2, 0, and 32, respectively. The operations performed by the above example include two branches, the instructions having the mnemonic "bc". The "nop" (no operation) instructions are introduced to "pad out" a fetch group corresponding to an embodiment of the present invention in which a fetch group includes eight instructions. If the first branch is not taken, then the next instruction executed is in the second fetch group which starts with the ninth instruction above, that is, the second "addic" instruction.

The first instruction, in the above illustration, moves the value in the register G2 into the register G0. The second instruction, denoted by the mnemonic "cmp" compares the value in the register G0 with the value in the register G1. In response to the comparison of the contents of the register operands, the "cmp" instruction sets a bit in a selected field, in this case field 0, in a condition register. If the content of register G0 is larger than the content of register G1, a first one of the plurality of bits in the selected field is set. If the contents are equal, a second one of the plurality of bits is set and if the contents of register G1 exceed the contents of register G0, a third one of the plurality of bits in the selected field of the condition register is set. Instruction (3), the first branch, acts in response to the second bit in the selected field of the condition register. If the second bit is set, the branch is taken, otherwise, the branch is not taken and the sequential path is followed. In the above, the first branch instruction toggles, that is, changes direction each time it executes, making prediction difficult.

Thus, the first time the first branch instruction, the third instruction above, executes, the value in register G1 is 1, the initial value, and the value in register G0 is two from the previous "addic" instruction, instruction (1). Thus, the "cmp" instruction sets the first bit in the selected field and instruction (3), the first branch instruction, is not taken, and the sequential path is followed, fetching the next fetch group, which begins with instruction (9), the second "addic" instruction.

Instructions (9)–(11) constitute a counter that counts up to the value of the contents of register G5, and the second branch, instruction (12), branches to instruction (2) with label "LB01". On returning to instruction (2), the contents of registers G0 and G1 are equal by virtue of the second "addic" instruction, instruction (9), which moves the contents of G1 to register G0. Because the contents of these registers are equal, the first "cmp" instruction sets the second bit in the selected field of the condition register, and the first "bc" branch instruction, instruction (3), is taken, whereby the flow returns to instruction (1) with label "LB00". Thus, in each of the iterations through the loop generated by the second fetch group, instructions (9)–(12), the first branch instruction, instruction (3), is executed twice and the direction toggles. In total the first branch instruction, instruction (3), is executed sixty-three times in the current example in which the contents of register G5 equals thirty-two.

After an initial five mis-predicts for the first branch, instruction (3), the path history becomes a repetition of the pattern "011". The initial value of register G5 of thirty-two is sufficient to ensure that the path history vector settles to a steady state value. However, an artisan of ordinary skill would understand that other exemplary values could have been chosen. At any particular fetch of the first fetch group which includes the first branch, instruction (3), there are two possibilities for the path history vector, in an embodiment of the present invention in which the path history vector includes eleven bits. The path history vector may either be "11011011011" or "01101101101".

In the two possible sequences of the path history vector, the prediction of the first branch is perfectly predictable in accordance with the principles of the present invention. In the first case, the prediction mechanism will predict not-taken because the mechanism determines that the next logic value to be shifted into the path history vector is "zero". Similarly, in the second case, the mechanism of the present invention predicts "taken" because the mechanism determines that the next logic value to be shifted into the path history vector is "one". In other words, the prediction mechanism in accordance with the principles of the present invention recognizes the pattern repetition in the path history vector. However, if there is a larger number of fetch groups in a loop, then the path history vector may not be long enough to capture the history and to make highly accurate predictions. For example, consider FIG. 1 illustrating a loop where the inner loop has five fetch groups and iterates four times. The last instruction of the last fetch group in the inner loop contains the conditional branch A, which is taken three times and then not taken. This is a difficult branch to predict and a one bit traditional prediction scheme (such as a local prediction algorithm) will predict this branch with only 50% accuracy.

The body of the outer loop consists of the inner loop and an additional five fetch groups after the inner loop and ends with the branch instruction B. The outer loop iterates a large number of times so branch B is easily predictable using traditional prediction algorithms. Both the branches, A and B, have the same target address, which is the beginning of both of the loops.

After (n) iterations of the outer loop, the path to reach branch A, for a taken resolution and a not-taken resolution, can be expressed in the following (the equation is written like a regular expression with (^n) representing that the previous entity repeats n times):
The bold numbers (1 or 0) corresponds to the branch A and the underlined bold numbers (1 or 0) letters correspond to branch B. Other 0's correspond to the fetch groups without any branches in them.

1. (00001)(00001)00001)000000000 1)^n(00001)(00001)(00001)0000 a not taken resolution. Complete sequence incorporating four iterations of five fetch groups containing branch A and one iteration of five fetch groups containing branch B. After seeing n histories, one would predict that after three successive taken branch A, branch A will be not taken.
2. (00001)(00001)00001)0000000001)^n0000 for the first taken resolution. After seeing n histories, one would predict that the first fetch group will contain branch A taken.
3. (00001)(00001)00001)0000000001)^n(00001)0000 for the second taken resolution. After seeing n histories, one would predict that the second fetch group will contain branch A taken.
4. (00001)(00001)00001)000000000 1)^n(00001)(00001)(00001)0000 taken resolution. After seeing n histories, one would predict that the third fetch group will contain branch A taken.

From these patterns, one can determine that, to properly distinguish between the paths for taken and not-taken resolution, the path history vector needs to be at least 20 bits long (to get a complete history of the fetch groups containing branch A requires four iterations of five fetch groups). If one did not have 20 bits in the path history vector, then prediction accuracy may suffer.

One embodiment of the present invention compresses "M" or less (but more than one) consecutive zeroes (0) (in the bit-string representing the path of execution) to one "0" to preserve more path information in the path history vector. Since taken branches determine changes in the flow of instruction fetching, all the ones (1) in the bit string are preserved. The algorithm may be expressed more precisely as follows:

Compression Algorithm
1. If the fetch group contains a taken branch, shift a logic one into the path history vector and reset the compression counter to zero.
2. If the fetch group does not contain any branch or contains only not-taken branch(es) and the compression counter is zero, then shift a logic zero into the path history vector. Increment the compression counter. If the compression counter reaches the maximum, then reset it to zero.
3. If the fetch group does not contain any branch or contains only not-taken branch(es) and the compression counter is not zero, then do not shift anything, but increment the compression counter. If the compression counter reaches the maximum, then reset it to zero.

With M=4, the path to reach branch A, for a taken resolution and a not-taken resolution, can be expressed using embodiments of the present invention as follows:

Again the bold digit represents that the fetch groups representing the digit contains an instance of execution of branch A (branch B) for an underlined bold digit). If the preceding algorithm is followed for the loop illustrated in FIG. 1, then the following compressed patterns will result.

1. $((01)(01)(01)000\underline{1})^\wedge n(01)(01)(01)0$ for a not-taken resolution for branch A.
2. $((01)(01)(01)000\underline{1})^\wedge n0$ for the first taken resolution for branch A.
3. $((01)(01)(01)000\underline{1})^\wedge n(01)0$ for the second taken resolution for branch A.
4. $((01)(01)(01)000\underline{1})^\wedge n(01)(01)0$ for the third taken resolution for branch A.

From these patterns, it is easy to determine that to properly distinguish between the paths for taken and not-taken resolution the path history vector needs to be at least 8 bits long (four iterations with two bit compressed fetch groups). The 8 bit long path history vector is interpreted as follows; if we reach branch A with a path history vector of:

10100010, then predict "taken"
10001010, then predict "taken"
00101010, the predict "taken"
10101010, then predict "not taken"

In some computers, the path history is eleven bits long and the branch A (in this example) will be perfectly predictable (after initial few mis-predictions) with the path history compression algorithm.

Advantages of the algorithm in the present invention

The compression algorithm improves the branch prediction accuracy, in particular for scientific loops. Performance analysis has shown that for the SparseMV benchmarks (scientific workload), the branch prediction accuracy, using embodiments of the present invention, improves over prior art methods. The algorithm easily adapts to high frequency design and may be easily adapted so that each zero bit in the path history vector spans a larger number of fetch groups. The algorithm may also be adapted so that successive zeroes in the compressed path history indicate larger and larger span of fetch groups.

Figure 2:
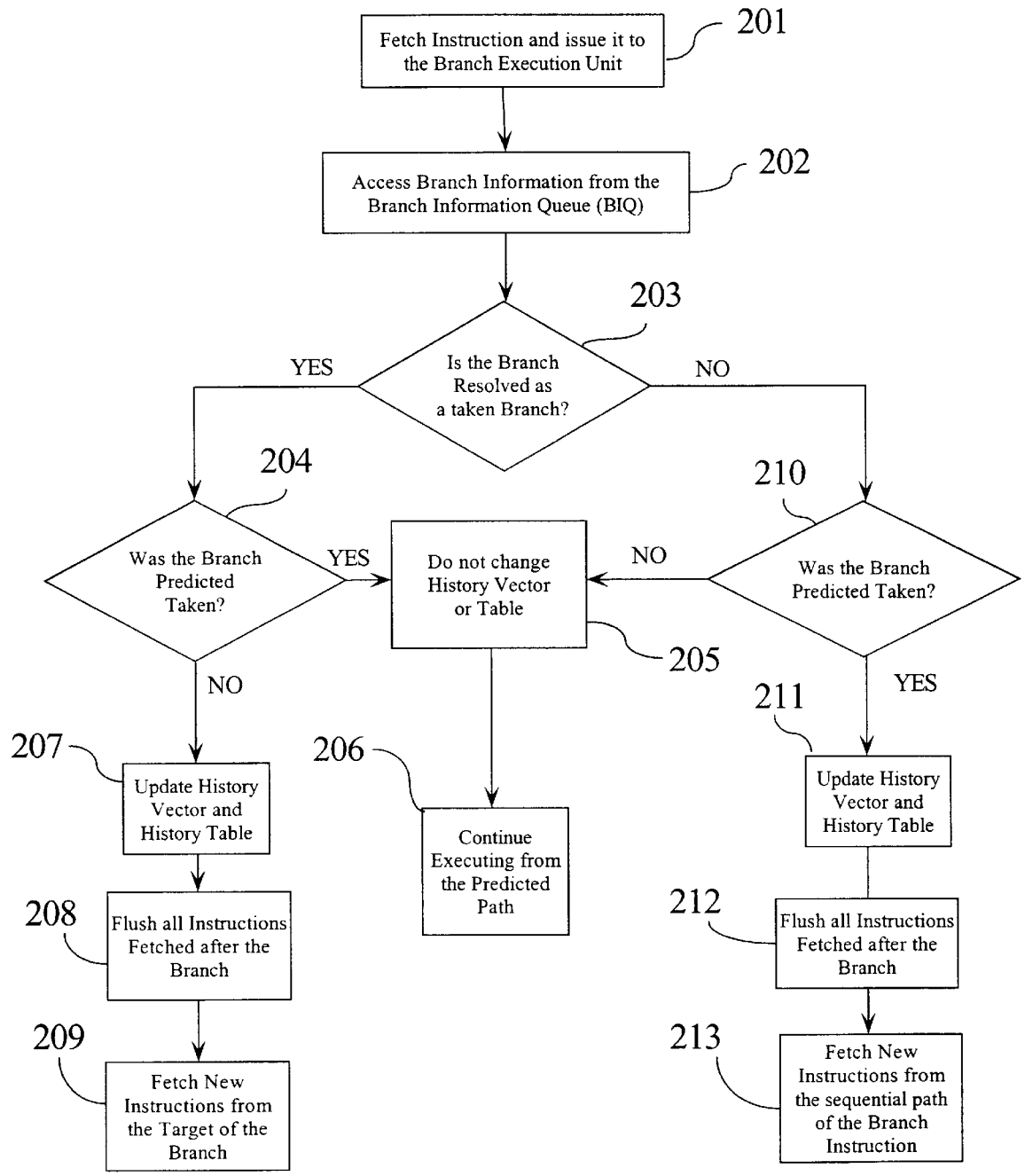
FIG. 2 is a flow diagram of method steps for updating a history vector and a history table.

FIG. 2 is a flow diagram of the steps where the path history vector and the global branch history table are updated after a branch is executed. In step 201, a branch instruction is fetched and issued to the branch execution unit. In step 202, the branch instruction queue information is accessed from the branch information queue (BIQ 656) for the branch instruction. In step 203, a test is done to determine if the branch instruction is resolved as a taken branch. If the result in step 203 is YES, then a test is done in step 204 to determine if the BIQ data indicates that the branch was predicted to be a taken branch. If the result of the test in step 204 is NO, then the history vector and the branch history table are updated for the branch instruction, in step 207.

In step 208, all the instructions after the branch instruction are flushed from the pipeline and in step 209 new instructions from the target address of the branch instruction are fetched and executed. If the result of the test in step 204 is YES, then the history vector and the branch history table are unchanged in step 205 and execution continues from the predicted path in step 206. If the result of the test in step 203 is NO, then a test is done in step 210 to determine if the BIQ data indicates that the branch was predicted to be a taken branch. If the result of the test in step 210 is YES, then the history vector and the history table are updated in step 211. Step 211 indicates that the branch was mis-predicted. In step 212, all the instructions after the branch instruction are flushed from the pipeline and in step 213 new instructions from the path sequential to the branch instruction are fetched and executed. If the result of the test in step 210 is NO, the history vector and the branch history table are unchanged in step 205 and execution continues from the predicted path in step 206.

Figure 5A:
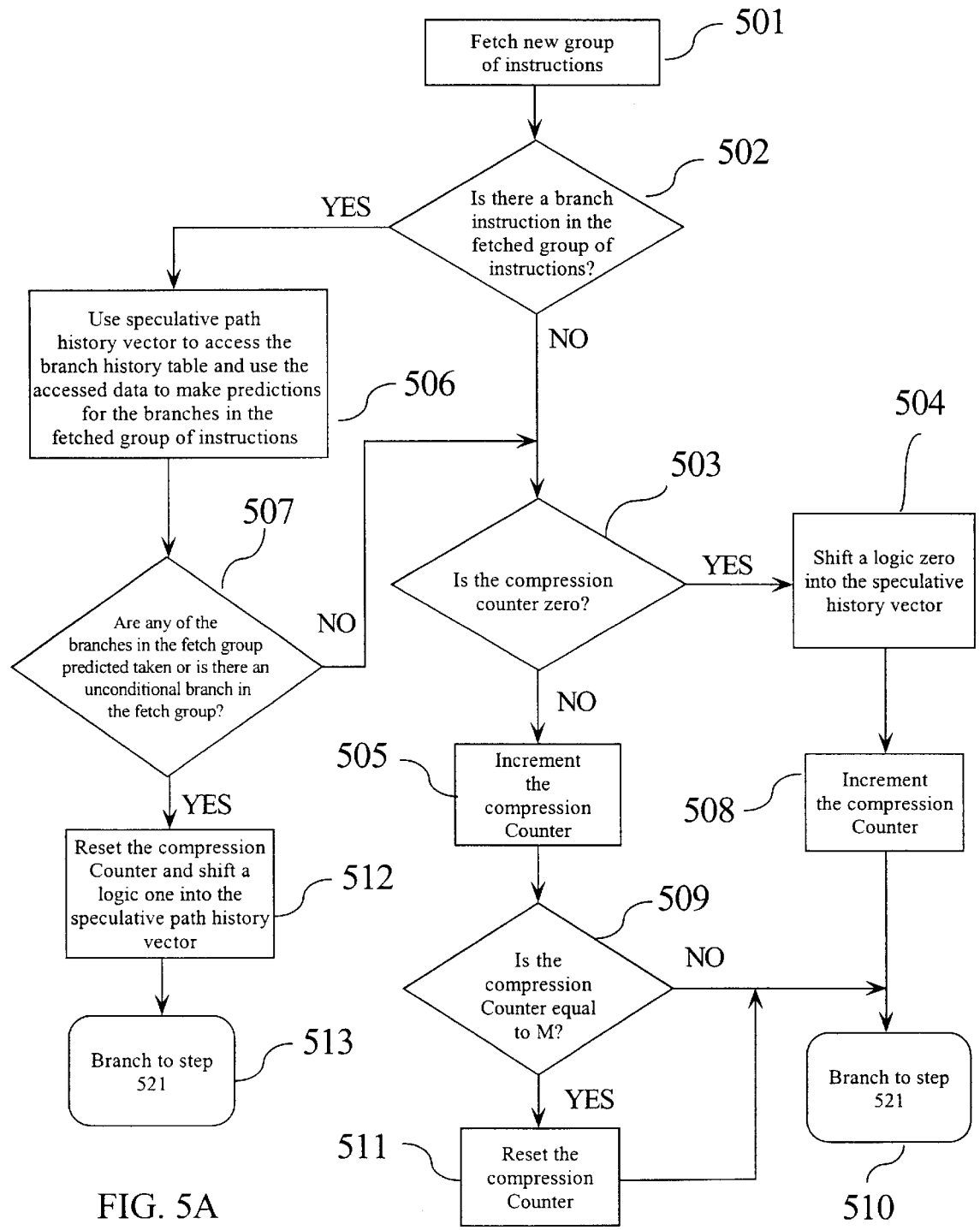
FIGS. 5A and 5B are flow diagrams illustrating the use of the path history vector in predicting speculative branches according to one embodiment of the present invention.

FIG. 5A is a flow diagram of the steps where the path history vector and the global branch history table are used according to one embodiment of the present invention. In step 501, a new group of instructions are fetched and the path of execution is determined. In step 502, a test is done to determine if the instruction is a branch instruction. If the result in step 502 is YES, then in step 506 the speculative path history vector is used to access the global branch history table to predict the branch. In step 507, a test is executed to determine if any of the branches in the fetch group were predicted taken or is there an unconditional branch in the fetch group. If the result of the test in step 507 is YES, then in step 512 the compression counter is reset and a logic one is shifted into the speculative path history vector and in step 513 a branch is executed to step 521 (refer to FIG. 5B). If the result of the test in step 507 is NO or the result of the test in step 502 is NO, then a branch is executed to step 503. In step 503, a test is executed to determine if the compression counter is reset or has a count of zero. If the result of the test in step 503 is NO, then in step 505 the compression counter is incremented by one and then a test is executed in step 509 to determine if the compression counter is equal to a maximum value M. If the result of the test in step 509 is YES, then the compression counter is reset in step 511 and in step 510 a return is executed to step 521 (refer to FIG. 5B). If the result of step 509 is NO, then step 510 is executed as above. If the result of step 503 is YES, then a logic zero is shifted into the shift register generating the speculative path history vector in step 504. The compression counter is incremented by one in step 508 and in step 510 a return is executed to step 521 (refer to FIG. 5B).

Figure 5B:
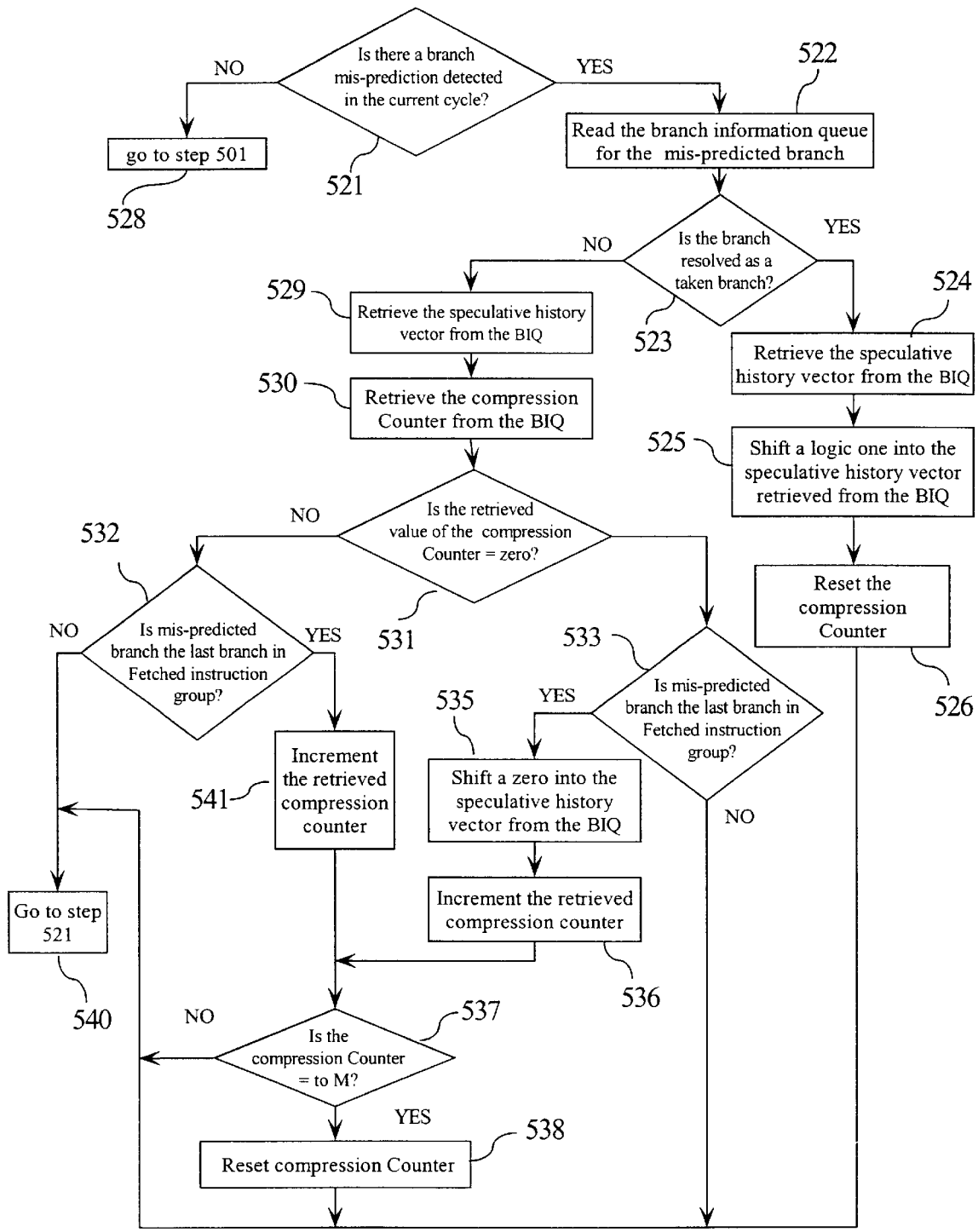

FIG. 5B is a continuation of the method of FIG. 5A. A branch to step 521 executes a test to determine if there is a branch mis-prediction detected in the current cycle. If the result of the test is NO, then a return to step 501 (refer to FIG. 5A) is executed in step 528. If the result of the test in step 521 is YES, then in step 522 the branch information queue (BIQ) is read for the mis-predicted branch. In step 523, a test is done to determine fi the branch is resolved as taken. If the result of the test in step 523 is YES, then the speculative history vector is retrieved from the BIQ. In step 525, a logic one is shifted into the speculative history vector retrieved from the BIQ and in step 526 the compression counter is reset and a branch is made back to step 521 in step 540. If the result of the test in step 523 is NO, then in step 529 the speculative history vector is retrieved from the BIQ. In step 530, the compression counter is retrieved from the BIQ. In step 531, a test is done to determine if the retrieved value of the compression counter equals zero. If the result of the test in step 531 is YES, then in step 533 a test is done to determine if the mis-predicted branch is the last branch in the fetched instruction group. If the result of the test in step 533 is NO, then a branch is executed to step 540 where a branch to step 521 is executed. If the result of the test in step 533 is YES, then in step 535 a zero is shifted into the speculative history vector from the BIQ and in step 536 the retrieved compression counter is incremented. From step 536 a test is executed in step 537 to determine if the compression counter is equal to a maximum value of M. If the result of the test in step 537 is YES, the compression counter is reset in step 538 and a branch is executed to step 521 in step 540. If the result of the test in step 537 is NO, then a branch is directly executed to step 540 where a return is executed to step 521. If the result of the test in step 531 is NO, then a test is done in step 532 to determine if the mis-predicted branch is the last branch in the fetched instruction group. If the result of the test in step 532 is NO, then in step 540 a return is executed to step 521. If the result of the test in step 532 is YES, then in step 541 the retrieved compression counter is incremented and the test of and branches of step 537 are executed.

Figure 3:
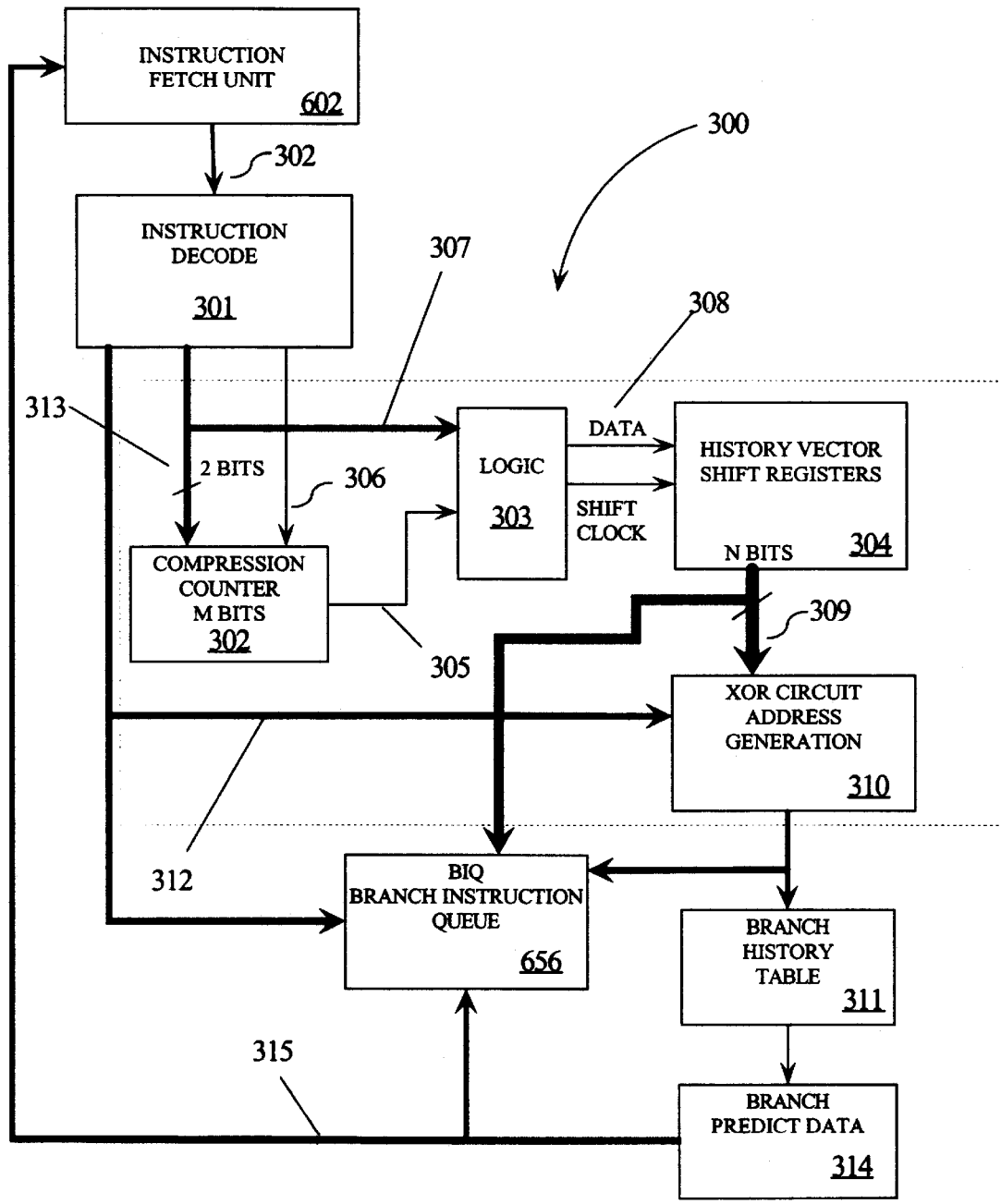
FIG. 3 is a block diagram of circuitry for compressing the zeros in a path history vector.

FIG. 3 is a block diagram of circuits 300 used in embodiments of the present invention to generate a compressed history vector. Instructions are fetched with Instruction Fetch Unit (IFU) 602 in a speculative path. The instructions are decoded in unit 301 which may be part of the IFU 602. Branch instruction control data 313 and 306 are coupled to compression counter 302 and are used to direct the reset or incrementing of compression counter 302. Path history vector 304 contains a shift register used to generate a path history vector. Address generation circuit uses an exclusive OR operation of the N bit history vector and the branch address to generate a unique N bit address for the history table 311. Branch predict data 314 is accessed using this address from the history table 311. The branch predict data 314 is coupled to the BIQ 656 and the IFU 602. The BIQ 656 maintains the data concerning branches that were speculatively fetched. Later when a branch instruction is executed, the BIQ 656 is accessed with the branch address and if the outcome of the branch execution matches the prediction for the branch, then the history table for the particular branch instruction is updated, otherwise it is left unchanged. Correspondingly, if the prediction for the branch, as obtained from the BIQ 656, does not match the outcome of the branch execution, all instructions fetched after the branch are flushed and new instructions are fetched. In such case, if the outcome of the branch execution indicates that the branch is taken, then new instructions are fetched from the target address of the branch instruction, otherwise new instructions are fetched from the sequential address of the branch instruction. Compression circuit 300 may also be entirely contained in IFU 602 in an embodiment of the present invention.

FIG. 6 is a block diagram of circuits in a processor 600 that may incorporate embodiments of the present invention. Instruction cache (I-cache) 640 contains instruction that have been fetched pending execution. Instructions are fetched by Instruction Fetch Unit 602 and where control and instructions are coupled to Dispatch unit 648 that determines the instruction type and which execution unit to direct the instruction. These execution units include a Floating Point Unit (FPU) 652 and Fixed Point Unit (FXU) 610 and a Branch/System Processing Unit 654 comprising sub-units BIQ 656 and BXU 653 used for particular branch instructions. Load/Store Unit 646 retrieves data from Data Cache (D-Cache) 642 and returns the data to particular execution units. I-Cache 640 may also access the D-Cache 642 directly via Bus Interface Unit 644. The circuitry for generating the compressed path history vector according to embodiments of the present invention may be contained in Instruction Fetch Unit 602.

Referring to FIG. 4, an example is shown of a data processing system 400 which may use embodiments of the present invention. The system has a central processing unit (CPU) 434, which is coupled to various other components by system bus 412. CPU 410 may contain hardware circuits or software routines operable to generate compressed path history vectors and use these path history vectors with a global branch history table to predict branch paths in speculative executed instructions according to embodiments of the present invention.

Although the present invention and its advantages have been described in detail, it should be understood that various changes, substitutions and alterations can be made herein without departing from the spirit and scope of the invention as defined by the appended claims.

What is claimed is:

1. A method of improving branch prediction accuracy comprising;
   providing a path history vector using an N bit shift register;
   shifting a first logic state into said path history vector if a fetched instruction group contains a taken branch instruction and setting a M count compression counter to a logic reset;
   shifting a second logic state into said path history vector if said fetched instruction group contains no taken branch instructions or contains only not taken branch instructions and said compression counter is reset, increment said compression counter if a compression count of said compression counter is less than M and resetting said compression counter if said compression count is equal to M;
   incrementing said compression counter if said compression count is greater than zero but less than M and said fetched instruction group does not contain any branch instructions or contains only not-taken branch instructions, and resetting said compression counter if said compression count is equal to M; and
   accessing a branch history table using an address generated in response to a content of said branch history vector by doing a bitwise exclusive OR (XOR) of said path history vector with an address of a fetched branch instruction in said fetched instruction group.

2. The method of claim 1, further comprising the step of:
   retrieving said stored branch decision for a previous branch instruction from said branch history table and using said stored branch decision to predict a branch for a present speculative branch instruction.

3. The method of claim 1, wherein said address of said branch history table is the result of a logic combination of said content of said branch history vector and an address of a fetched branch instruction from said fetched instruction group.

4. The method of claim 3, wherein said logic combination is a bitwise exclusive OR function.

5. The method of claim 1, wherein said method is applied within a fetched instruction group boundary.

6. The method of claim 1, wherein said method is applied across fetched instruction group boundaries.

7. A system for improving branch prediction accuracy comprising:
   a fetch instruction circuit operable to fetch instructions from an instruction storage unit;
   an instruction decode circuit operable to generate decode outputs and control signals as a function of instruction type and an execution history for fetched instructions;
   an M bit compression counter, said M bit compression counter receiving said decode outputs and said control signals; said M bit compression counter generating compression counter signals in response to said decode outputs and said control signals and a compression count;

an N bit shift register receiving said decode outputs and said control signals and generating an N bit parallel path history vector; and a predict circuit operable to receive said generated path history vector and access a branch history table and predict a branch instruction execution in response to data stored in said branch history table.

8. The system of claim 7, wherein said decode outputs correspond to a first decode logic state if said fetched instruction group contains only branch instructions not taken or no branch instructions and a second decode logic state if said fetched instruction group contains a branch instruction that was taken.

9. The system of claim 7, wherein a first logic state is shifted into said path history vector in response to said second decode logic state and said compression counter is set to a zero compression count.

10. The system of claim 7, wherein a second logic state is shifted into said path history vector in response to said first decode logic state and a zero compression count of said compression counter.

11. The system of claim 10, wherein said compression counter is incremented by one and said compression counter is reset if said compression count is equal to M.

12. The system of claim 7, wherein no logic state is shifted into said path history vector in response to said first decode logic state and a compression count greater than zero but less than M.

13. The system of claim 12, wherein said compression counter is incremented by one and said compression counter is reset if said compression count is equal to M.

14. The system of claim 7, wherein a branch history table is accessed using an address generated by executing a bitwise XOR of said path history vector and an address of a branch instruction in said fetched instruction group.

15. A data processing system, comprising:

a central processing unit (CPU);

a random access memory (RAM);

a read only memory (ROM);

an I/O adapter; and a bus system coupling said CPU to said ROM, said RAM said display adapter, wherein said CPU further comprises:

circuitry operable to fetch instructions from an instruction storage unit;

circuitry operable to generate decode outputs and control signals as a function of instruction type and an execution history for fetched instructions;

circuitry operable to generate an M bit compression counter, said M bit compression counter receiving said decode outputs and said control signals; said M bit compression counter generating compression counter signals in response to said decode outputs and said control signals and a compression count;

circuitry operable to receive said decode outputs and said control signals and generate an N bit path history vector; and circuitry operable to receive said N bit path history vector and access a branch history table and predict a branch instruction execution in response to data stored in said branch history table.

16. The data processing system of claim 15, wherein said decode outputs correspond to a first decode logic state if said fetched instruction group contains only branch instructions not taken or no branch instructions and a second decode logic state if said fetched instruction group contains a branch instruction that was taken.

17. The data processing system of claim 15, wherein a first logic state is shifted into said path history vector in response to said second decode logic state and said compression counter is set to a zero compression count.

18. The data processing system of claim 15, wherein a second logic state is shifted into said path history vector in response to said first decode logic state and a zero compression count of said compression counter.

19. The data processing system of claim 15, wherein said compression counter is incremented by one and said compression counter is reset if said compression count is equal to M.

20. The data processing system of claim 15, wherein no logic state is shifted into said path history vector in response to said first decode logic state and a compression count greater than zero but less than M.

21. The data processing system of claim 20, wherein said compression counter is incremented by one and said compression counter is reset if said compression count is equal to M.

22. The data processing system of claim 15, wherein a branch history table is accessed using an address generated by executing a bitwise XOR of said path history vector and an address of a branch instruction in said fetched instruction group.

* * * * *

UNITED STATES PATENT AND TRADEMARK OFFICE
CERTIFICATE OF CORRECTION

PATENT NO. : 6,766,443 B2
DATED : July 20, 2004
INVENTOR(S) : Balaram Sinharoy

It is certified that error appears in the above-identified patent and that said Letters Patent is hereby corrected as shown below:

<u>Column 7,</u>
Line 34, following "invention" please insert -- : --.

Signed and Sealed this

Third Day of May, 2005

JON W. DUDAS
*Director of the United States Patent and Trademark Office*